US005431235A

United States Patent [19]

[11] Patent Number: 5,431,235

[45] Date of Patent: Jul. 11, 1995

Drumheller et al.

[54] RECIPROCAL CHUCK FOR PAVING BREAKER

[75] Inventors: Steven W. Drumheller; Ted C. Chang, both of Roanoke, Va.

[73] Assignee: Ingersoll-Rand Company, Woodcliff Lake, N.J.

[21] Appl. No.: 234,743

[22] Filed: Apr. 28, 1994

[51] Int. Cl.[6] .......... B23B 45/16

[52] U.S. Cl. .......... 173/211; 173/128; 279/19.1; 279/19.6

[58] Field of Search .......... 173/211, 131, 129, 130, 173/132, 128, 115; 279/19.1, 19, 19.5, 19.6

[56] References Cited

U.S. PATENT DOCUMENTS

| | | | |
|---|---|---|---|
| 1,100,393 | 6/1914 | Ober . | |
| 1,142,238 | 6/1915 | Cook . | |
| 1,553,261 | 9/1925 | Overly . | |
| 1,679,291 | 7/1928 | Byers | 173/211 |
| 1,690,571 | 11/1928 | Donaldson . | |
| 1,731,836 | 10/1929 | Williams . | |
| 1,743,988 | 1/1930 | Van Yahres . | |
| 2,102,264 | 12/1937 | Haas . | |
| 2,372,029 | 3/1945 | Stair | 173/211 |
| 3,179,185 | 4/1965 | O'Farrell | 279/19.6 |
| 3,326,303 | 6/1967 | Jones, Jr. . | |
| 3,451,492 | 6/1969 | Elxström et al. | 173/211 |
| 3,912,023 | 10/1975 | Amtsberg . | |
| 3,972,376 | 8/1976 | Price | 279/19.1 |
| 4,491,444 | 1/1985 | Rumpp et al. | 279/19.6 |
| 4,614,241 | 9/1986 | Crover | 173/211 |
| 4,648,609 | 3/1987 | Deike . | |

*Primary Examiner*—Scott A. Smith

*Attorney, Agent, or Firm*—John J. Selko

[57] ABSTRACT

A handheld paving breaker includes a reciprocal chuck in a front head and an elastic spring for biasing the chuck toward the fronthead. The chuck can move longitudinally, but is restrained from rotation in the fronthead. A moil mounted in the chuck is biased against the work surface by the chuck, to provide better control of the moil, during start-up and operation. Wear pads between the spring and members against which the spring is seated improve spring life.

8 Claims, 3 Drawing Sheets

RECIPROCAL CHUCK FOR PAVING BREAKER

BACKGROUND OF THE INVENTION

This invention relates generally to paving breakers, and more particularly to an apparatus on a paving breaker for retaining and stabilizing a moil in the fronthead of a paving breaker.

The traditional handheld paving breaker design consists of a piston transferring energy through an anvil block to a moil. One of the purposes of the anvil block is to keep the moil point on the working surface, as pressurized air enters the breaker. However, a 15 percent loss of power is incurred during the transfer of energy through the anvil block. To maximize power, the anvil block can be eliminated. However, with no anvil block, the problem of stabilizing the moil increases. The moil tends to bounce from the work surface, making operation of the breaker difficult.

The foregoing illustrates limitations known to exist in present paving breakers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a paving breaker having a housing forming a first bore with a longitudinal axis extending therethrough and a piston in said first bore reciprocal along said longitudinal axis; a moil retaining apparatus comprising: piston bearing means in said first bore extending longitudinally within said housing for slidably supporting an end of said piston, said piston bearing means forming a second bore concentric with said first bore around said axis; a front head extending longitudinally from within said housing, said front head forming a third bore concentric with said first and second bores around said axis; latch means on said front head for releasably holding a moil in said front head; reciprocal chuck means extending longitudinally within said front head for slidably holding a top end of a moil, said chuck means forming a fourth bore concentric with said first, second and third bores around said axis, said chuck means being slidable longitudinally in said front head between a first and second stop position; biasing means in said housing, for biasing said chuck means longitudinally toward said fronthead; retainer means in said fronthead for permitting longitudinal movement of said chuck means, while restraining rotational movement of said chuck means; first mounting means for releasably mounting said piston bearing means in said housing; and second mounting means for releasably mounting said chuck means in said front head.

The foregoing and other aspects will become apparent from the following detailed description of the invention when considered in conjunction with the accompanying drawing FIGURES.

BRIEF DESCRIPTION OF THE DRAWING FIGURES

DETAILED DESCRIPTION

Figure 1:
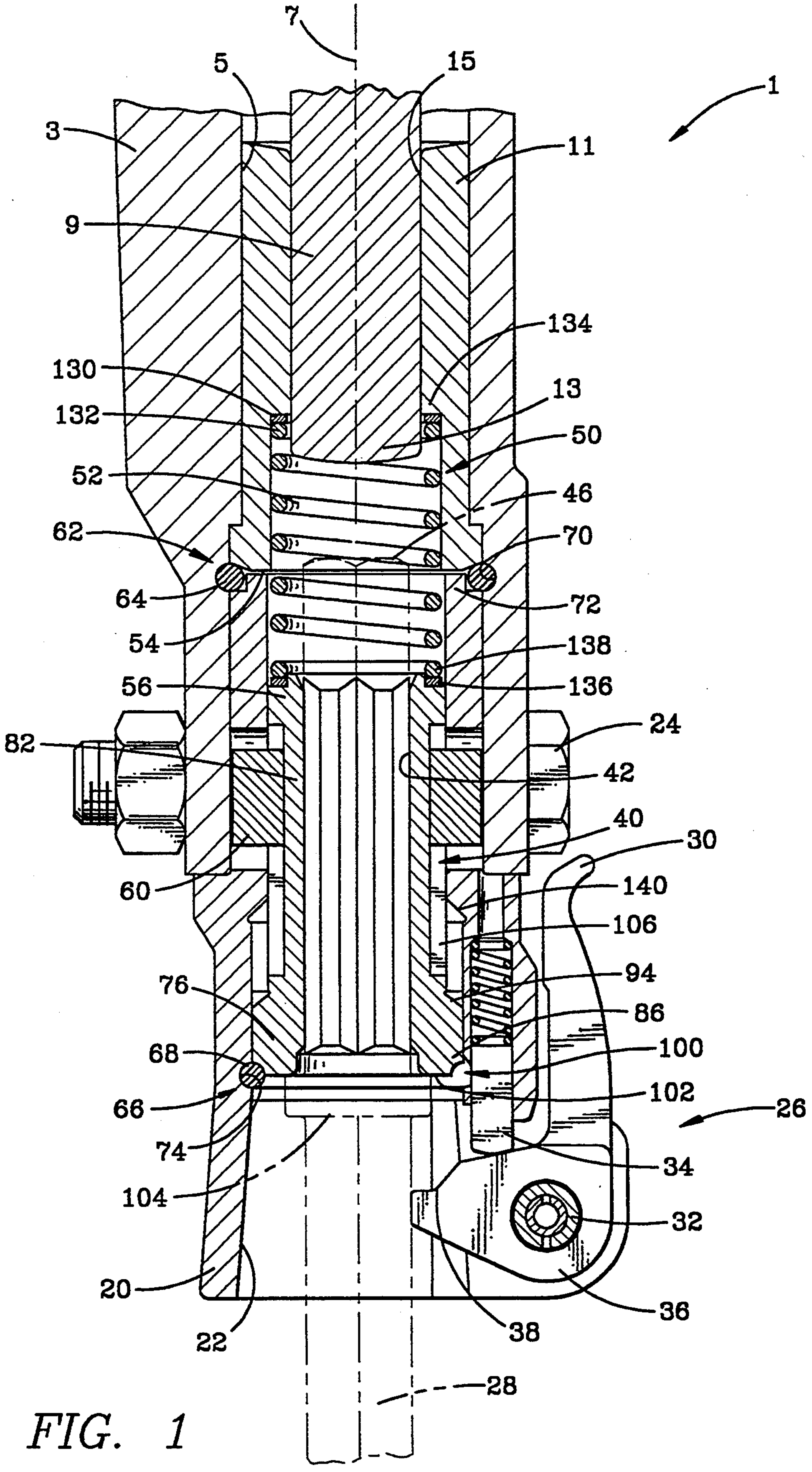
FIG. 1 is a schematic elevational view of a front portion of a paving breaker, in cross-section, with parts removed, showing the reciprocal chuck of this invention in a first stop position.
Figure 2:
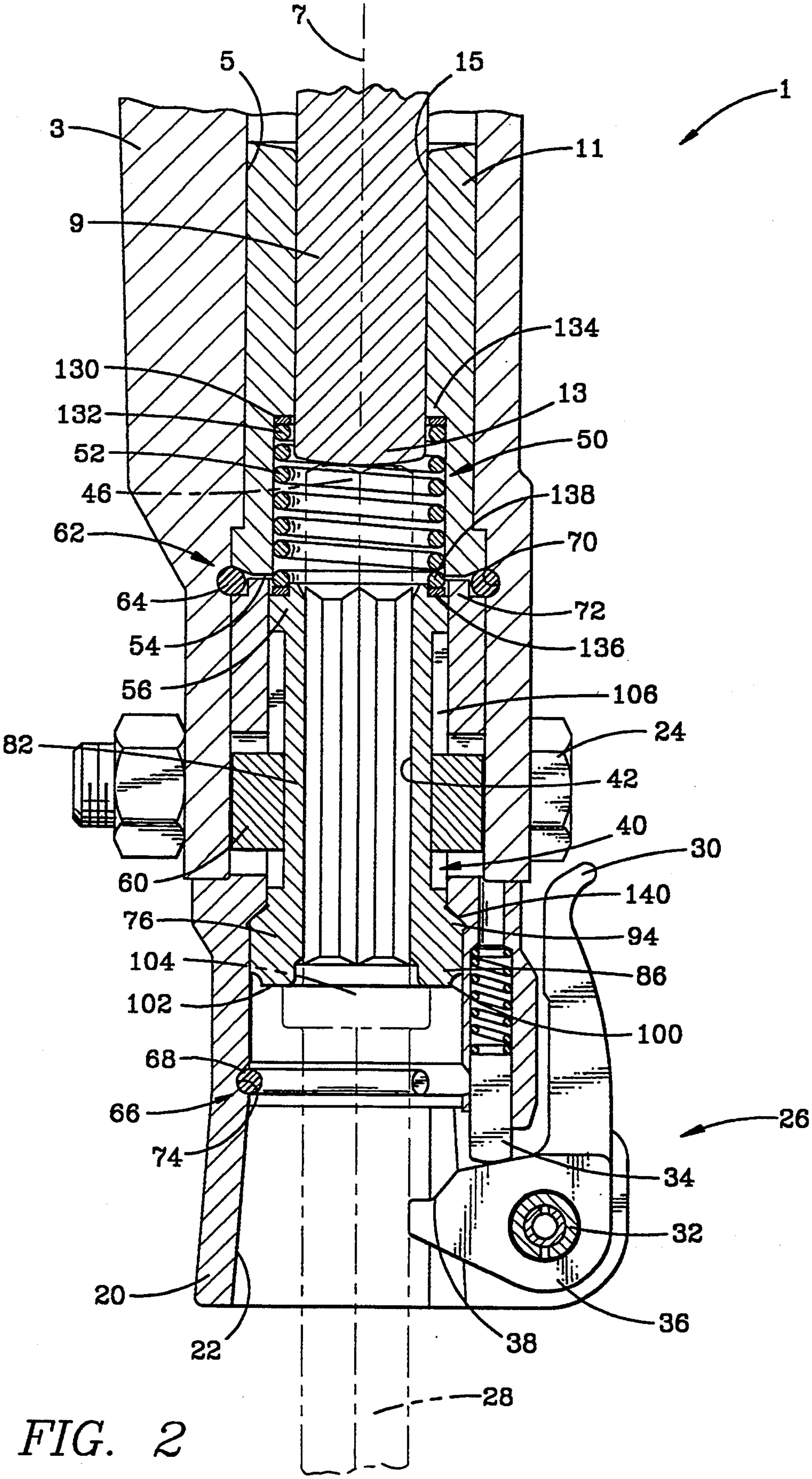
FIG. 2 is a view similar to FIG. 1, showing the reciprocal chuck of this invention in a second stop position.

Referring to FIGS. 1 and 2, a paving breaker is shown generally as 1, having a housing 3 that forms a first bore 5, with a longitudinal center axis 7 extending therethrough. A piston 9 in first bore 5 is reciprocal along axis 7, as is well known. The back end of the paving breaker 1 is not shown, but includes an back head, with operator control handles thereon, as well as entrance and exhaust ports for transmitting compressed air through the breaker to operate the piston, as is well known.

Piston bearing means 11 in first bore 5 extends longitudinally within housing 3 for slidably supporting an end 13 of piston 9. Piston bearing means 11 forms a second bore 15 concentric with first bore 5, around axis 7. A front head 20 extends longitudinally from within housing 3. Front head 20 forms a third bore 22 concentric with first bore 5 and second bore 15. Front head 20 is held in housing 3 by a nut and bolt fastener 24 compressing housing 3 around fronthead 20, as is well known.

A conventional latch means 26 is mounted on fronthead 20 for releasably holding a moil 28 (shown in phantom) in fronthead 20. Latch means 26 includes a latch handle 30 pivotable about a pivot pin 32 that is mounted on fronthead 20. A spring biased plunger 34 rides on latch head 36 as latch handle is pivoted between an open and closed position. With latch 26 in the open position, plunger 34 rests in depression 38 to provide a detent, or holding action, as is well known. Other types of latch mechanisms will work.

A reciprocal chuck means 40 extends longitudinally outwardly from within front head 20. Chuck means 40 forms a fourth bore 42 concentric with first bore 5, second bore 15 and third bore 22, around axis 7. Chuck means 40 slidably retains a top end 46 of moil 28. Chuck means 40 is slidable longitudinally in fronthead 20 between a first and second stop position, as described hereinafter.

Biasing means 50 in housing 3 biases chuck means 40 toward fronthead 20, so as to force moil 28 into contact with the work surface, not shown, as a way of controlling moil 28 during start-up of the breaker. Biasing means 50 is preferably an elastic spring 52 compressible between a bottom end 54 of piston bearing means 11 and a top end 56 of chuck means 40. Other types of elastic biasing will work, such as pneumatic, or hydraulic means.

Retainer means 60 in fronthead 20 permits longitudinal movement of chuck means 40, while simultaneously restraining chuck means 40 from rotational movement, as described hereinafter.

First mounting means 62 releasably mounts piston bearing means 40 in housing 3. First mounting means 62 is preferred to be an elastic split ring 64, as is well known. Second mounting means 66 releasably mounts chuck means 40 in front head 20. Second mounting means 66 is preferred to be an elastic split ring 68, as is well known. First split ring 64 is positioned in a circumferential groove 70 in an inner surface of housing 3. Split ring 64 extends into first bore 5 (FIGS. 1 and 2), to contact bottomsend 54 of piston bearing means 11 and top end 72 of fronthead 20. Second split ring 68 is positioned in a circumferential groove 74 in an inner surface of fronthead 20. Split ring 68 extends into fourth bore 42 (FIGS. 1 and 2), to contact, as a stop, bottom end 76 of chuck means 40.

Figure 3:
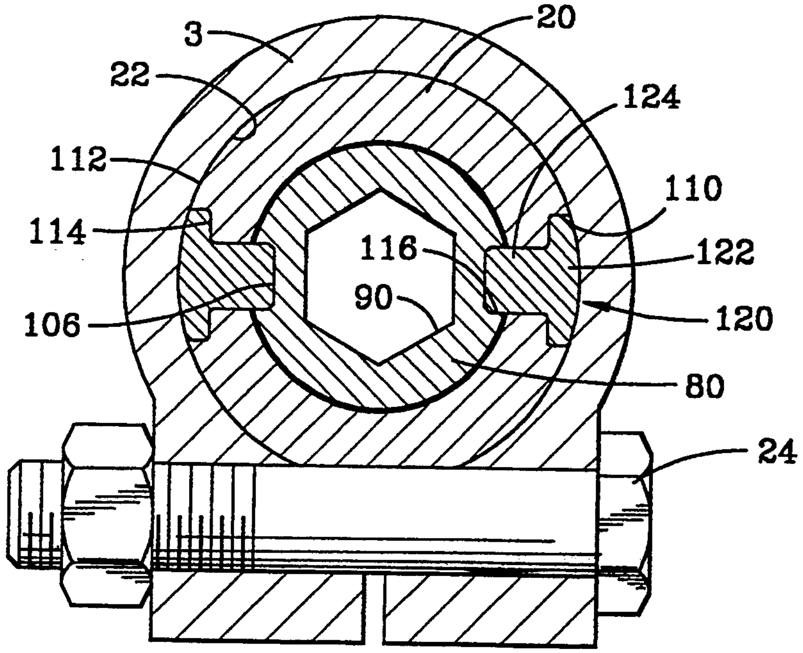
FIG. 3 is schematic plan view of a front portion of a paving breaker, in cross-section, with parts removed, showing a chuck restrained from rotational movement in a fronthead by two rivets, the fronthead being shown in the housing of the paving breaker.
Figure 4:
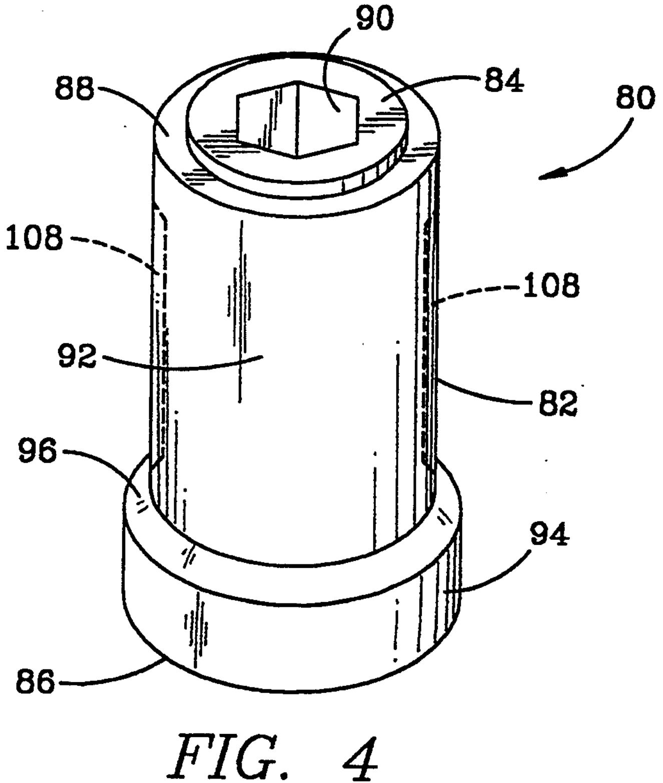
FIG. 4 is an isometric schematic view of the reciprocal chuck of this invention.

Now referring to FIG. 4, the chuck 80 of the invention is shown. Chuck 80 comprises an elongated tubular body 82 terminating at top end 84 and bottom end 86. Top end 84 forms a top shoulder portion 88 for seating spring 52. Body 82 has an inner surface 90 forming fourth bore 42. As viewed in a horizontal cross-section (FIG. 3), inner surface 90 is polygonal in shape, similar to top portion 46 of moil 28, so that moil 28 can reciprocate in chuck 80, but it cannot rotate therein. Body 82 has an external surface 92 extending between top end 84 and bottom end 86. External surface 92, adjacent bottom end 86, forms a radially extending collar 94, with a sloped contact shoulder 96 thereon, for stopping chuck 80 at a first stop position, as described hereinafter. Body 82, at bottom end 86, forms a bottom shoulder 100 (FIGS. 1 and 2) comprising, at a first portion 102, a surface for contacting, as a stop, a protruding moil collar 104, shown in phantom in (FIGS. 1 and 2).

At a second portion of bottom end 86 is provided a grooved surface 106 for contacting split ring 68 to provide a second stop position for chuck 80, as described hereinafter. Body 82 also includes at least one longitudinally extending keyway 108 between top end 84 and bottom end 86. Keyway 108 receives retainer means 60 therein. We prefer two keyways, diametrically oppositely spaced around a perimeter formed by external surface 92, with each keyway 108 receiving a retainer means 60. Retainer means 60 permits longitudinal movement of chuck 80, but simultaneously restrains rotational movement thereof.

Now referring to FIGS. 1, 2 and 3, the retaining means 60 will be further described. At least one radially extending bore 110 is positioned in a sidewall 112 of fronthead 20. Bore 110 ends at a bottom surface 114 within sidewall 112. Extending the rest of the way through sidewall 112 is an aperture 116 between bottom surface 114 and third bore 22. A removable rivet 120 is positioned in bore 110. Rivet 120 has a head 122 bottomed against bottom surface 114, and a shank 124 radially extending into third bore 22 via aperture 116. Shank 124 is slidably positioned in groove 106 on chuck 80. We prefer two such retainer means.

Now referring to FIGS. 1 and 2. In order to maximize spring life, a first annular wear pad 130 is positioned between a top end 132 of spring 52 and bottom end 54 of piston bearing means 11. Spring 52 and pad 130 contact a shoulder 134 in second bore 15, formed at the location of change of diameter of second bore 15. A second annular wear pad 136 is positioned between a bottom end 138 of spring 52 and top end 84 of chuck 11. Spring 52 and pad 136 contact a shoulder 88 on top end 84 of chuck 80, formed at a location of change of diameter of body 82. We prefer the wear pads 130 and 136 to be provided from a nonmetallic material such as an acetal resin supplied by The DuPont Corporation under the registered trademark DELRIN II.

In assembling the breaker, piston bearing means 11 is telescoped into housing 3, and split ring 64 is snapped into place. Rivets 120 are placed into bores 110 and fronthead 20 is placed in housing 3. Chuck 80 is telescoped into housing 3, aligning grooves 106 with shanks 124. Bolt and nut 24 are tightened to lock the assembly in place. Split ring 68 is snapped into groove 74. Finally, moil 28 is inserted into chuck 80 and latch means 26 is closed.

FIG. 1 shows the arrangement of the assembly when the moil 28 is just barely in contact with the work surface, with only the weight of the housing 3 acting on the spring 52. Chuck 80 is in the first stop position wherein collar 94 and groove portion 106 are forced against split ring 68 by spring 52.

FIG. 2 shows the arrangement of the assembly when the breaker is being operated, with an operator pressing on the breaker. Spring 52 is compressed, and chuck 80 is in the second stop position, wherein sloped surface 94 contacts and stops against a shoulder 140 formed on the internal surface of front head 20, shoulder 140 extending radially into third bore 22.

It should be understood that the terms "top" or "bottom" as used herein refer to the orientation of elements of the breaker, with the work surface horizontal and the breaker held in the normal vertical working position. A rotation of the breaker out of vertical would rotate the "top" and "bottom" orientation along therewith.

Having described the invention, what is claimed is:

1. In a paving breaker having a housing forming a first bore with a longitudinal axis extending therethrough and a piston in said first bore reciprocal along said longitudinal axis, a moil retaining apparatus comprising:

piston bearing means in said first bore extending longitudinally within said housing for slidably supporting an end of said piston, said piston bearing means forming a second bore concentric with said first bore around said axis;

a front head extending longitudinally from within said housing, said front head forming a third bore concentric with said first and second bores around said axis;

latch means on said front head for releasably holding a moil in said front head;

reciprocal chuck means extending longitudinally from within said front head for slidably holding a top end of a moil, said chuck means forming a fourth bore concentric with said first, second and third bores around said axis, said chuck means being slidable longitudinally in said front head between a first and second stop position;

biasing means in said housing, for biasing said chuck means longitudinally toward said fronthead;

retainer means in said fronthead for permitting longitudinal movement of said chuck means, while restraining rotational movement of said chuck means;

first mounting means for releasably mounting said piston bearing means in said housing; and second mounting means for releasably mounting said chuck means in said front head.

2. The paving breaker of claim 1 wherein said biasing means is an elastic spring compressible between a bottom end of said piston bearing means and a top end of said chuck means.

3. The apparatus of claim 2 wherein said reciprocal chuck comprises:

an elongated tubular body terminating at said top end and terminating at a bottom end;

said top end forming a top shoulder for seating said elastic biasing means;

said body having an inner surface forming said fourth bore, said inner surface, as viewed in horizontal cross-section, being polygonally shaped similarly to a top end portion of a moil shank;

said body having an external surface extending between said top and bottom ends, said external surface, adjacent said bottom end, forming a radially extending collar means, for stopping said chuck at said first stop position;

said body at said bottom end forming a bottom shoulder further comprising:

at a first portion, a surface for contacting, as a stop, a protruding collar of a moil shank; and at a second portion, a grooved surface for contacting said second mounting means, for stopping said chuck at said second stop position; and said external surface having at least one keyway extending longitudinally therealong between said top and bottom ends, for receiving said retainer means slidably therein.

4. The paving breaker of claim 3 further comprising:

first wear pad means between a top end of said spring and said bottom end of said piston bearing means, for improving wear life of said spring; and second wear pad means between a bottom end of said spring and said top end of said chuck means, for improving wear life of said spring.

5. The paving breaker of claim 4 wherein said retainer means further comprises:

at least one radially extending bore in a sidewall of said fronthead, said bore ending at a bottom surface within said sidewall;

a radially extending aperture from said bottom surface into said third bore; and a removable rivet positioned in said bore, said rivet having a head portion bottomed against said bottom surface and a shank member extending radially therefrom into said third bore, said shank member being slidably positioned in said longitudinal groove of said chuck means.

6. The apparatus of claim 5 wherein said first mounting means is an elastic split ring member positioned in a circumferential groove in an inner surface of said housing, said split ring member extending into said first bore to contact a bottom end of said piston bearing means and said top end of said fronthead.

7. The apparatus of claim 6 wherein said second mounting means is an elastic split ring member positioned in a circumferential groove in an inner surface of said fronthead, said split ring member extending into said fourth bore to contact, as a stop, said bottom end of said reciprocal chuck.

8. A paving breaker comprising:

A housing forming a first bore having a longitudinal axis extending therethrough;

a piston in said first bore reciprocal along said longitudinal axis;

piston bearing means in said first bore extending longitudinally within said housing for slidably supporting an end of said piston, said piston bearing means forming a second bore concentric with said first bore around said axis, a front head extending longitudinally from within said housing, said front head forming a third bore concentric with said first and second bores around said axis;

latch means on said front head for releasably holding a moil in said front head;

reciprocal chuck means extending longitudinally from within said front head for slidably holding a top end of a moil, said chuck means forming a fourth bore concentric with said first, second and third bores around said axis, said chuck means being slidable longitudinally in said front head between a first and second stop position;

elastic biasing means between a bottom end of said piston bearing means and a top end of said chuck means, for biasing said chuck means longitudinally toward said fronthead;

retainer means in said fronthead for permitting longitudinal movement of said chuck means, while restraining rotational movement of said chuck means;

first mounting means for releasably mounting said piston bearing means in said housing; and second mounting means for releasably mounting said chuck means in said front head.

* * * * *